April 28, 1970  E. GUNDERS  3,508,878

CONTAINERS FOR DISPENSING DROP-SIZE QUANTITIES OF LIQUIDS

Filed Dec. 5, 1966

INVENTOR.
EFRON GUNDERS
BY
OSTROLENK, FABER, GERB & SOFFEN
ATTORNEYS

United States Patent Office 3,508,878
Patented Apr. 28, 1970

3,508,878
CONTAINERS FOR DISPENSING DROP-SIZE
QUANTITIES OF LIQUIDS
Efron Gunders, Rehovoth, Israel, assignor to Yeda Research and Development Co., Ltd., Rehovoth, Israel
Filed Dec. 5, 1966, Ser. No. 599,053
Claims priority, application Israel, Dec. 29, 1965,
24,894
Int. Cl. G01n 31/00; B65d 35/08, 35/22
U.S. Cl. 23—253      4 Claims

ABSTRACT OF THE DISCLOSURE

Container for use in chemical and serological analysis made of thin plastic material, the container being adapted for dispensing drop-size quantities of fluids contained therein. The container is particularly suitable for use in blood typing.

---

The present invention relates to a novel type of container for use in chemical and serological analysis. More particularly the present invention relates to a novel container made of thin plastic sheeting, the container being adapted for dispensing drop-size quantities of fluids contained therein. Containers according to the present invention are of use when it is necessary to dispense drop-size quantities of any reagent, serum or the like. Such containers are also of use when it is desired to separate a given system by sedimentation, permanently separate the components from one another and to obtain subsequently samples of the two separated liquid phases, as is the case in blood typing where the whole blood is separated by sedimentation into a fraction consisting of red cells and into a fraction consisting mainly of serum. Such containers are of use in all kinds of serological analysis, in spot-testing and the like more. In the following the present invention will be described by way of illustration with reference to specific embodiments developed for blood typing, but it is to be clearly understood that this is not to be construed in a limitative sense.

For determining the blood group of a patient or donor, a sample of his whole blood is first separated by sedimentation into red cells and into plasma, and the blood group is determined by admixing a drop of the red cells with a drop of a test serum or a drop of serum with a drop of test red cells. A number of such tests provide all the necessary information. Before carrying out a transfusion a cross-match test is made which involves testing the compatibility of the serum of the patient with the cells of the donor and vice versa.

Hitherto a blood sample of several milliliters was introduced into a glass vial, separated by sedimentation, and the tests were carried out on glass slides, tiles and the like. Also the test sera were stored in glass bottles or vials, and large drop-size quantities were withdrawn as required. For automatic blood-matching devices and for blood-grouping tests to be carried out under inconvenient conditions, such as in disaster areas, under war-time conditions and the like, the novel dispenser-containers are of substantial advantage in that they are easily transported and safely handled, not being breakable. Human mistakes due to incorrect selection of test materials are eliminated by fixing the order of the test materials in the package. These dispensers also give the only known way of permanently separating components and keeping them subsequently sterile. The drops used for testing may be much smaller than delivered by conventional pipettes, and the test materials dispensers may be packaged in quantities suitable for differing numbers of tests.

The novel dispenser-containers according to the present invention which are adapted to dispense drop-size quantities of liquids stored therein, comprise at least one container for a liquid made of plastic sheeting bonded in such manner as to define a reservoir for the liquid with a tube for filling the container reaching from one side of the dispenser into the container and a capillary extending from this container to the edge of the sheeting, wherethrough the liquid can be dispensed at will be the application of pressure on the container. According to one preferred embodiment of the invention there is provided a liquid reservoir with at least two capillaries extending therefrom, or a dispenser-container comprising a plurality of discrete liquid reservoirs, each of which is provided with at least one capillary for dispensing its contents as drop-size quantities.

The liquids may be stored for prolonged periods of time in the novel type of containers, and in this case it is advantageous to seal the outlets of the capillaries and to open this seal only when it is necessary to dispense the content of the container.

The novel type of dispenser-container may be advantageously used in blood typing for first separating the whole blood into a fraction of red cells and one of serum, for separating these fractions, and for obtaining drop-size samples of each of these at will for blood typing.

Dispenser-containers according to the present invention are prepared from pliable plastic sheeting, bonded in such manner so as to define the required reservoirs for the liquids and capillary outlets therefrom. According to a preferred embodiment thin plastic sheeting of the thermoplastic type, as for example readily available polyethylene sheeting is used, which is heat-sealed in such manner so as to obtain the necessary reservoirs and outlets. The outlets can be easily provided by inserting wires of suitable diameter between the two sheets when these are bonded in the required form, and withdrawing these after cooling the thus produced container to ambient temperature.

The present invention will be described hereinafter with reference to the enclosed schematical drawing, which is not according to scale, and in which.

Figure 1:
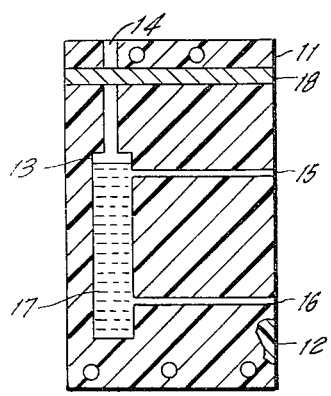
FIGURES 1, 2, 3 and 4 are schematical front views of dispenser-containers according to the present invention for use in the separation of blood into cells and into serum.

The container shown in FIGURE 1 comprises two thin thermoplastic sheets, such as the common sheets of polyethylene which are commercially available and used for the production of polyethylene bags or for wrapping, 11 and 12, which are super-positioned so as to coincide, and which are firmly bonded with each other over the entire surface of the sheets, except for the part of the area which defines the reservoir 13, the inlet tube 14 and the outlet capillaries 15 and 16. Polyethylene sheeting may be bonded conveniently by heat-sealing in a heated press.

Figure 2:
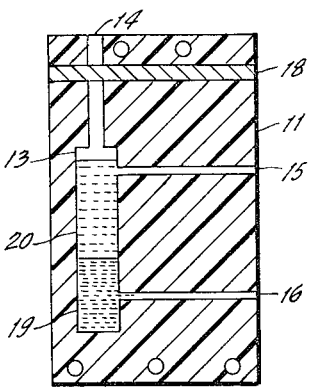
Figure 3:
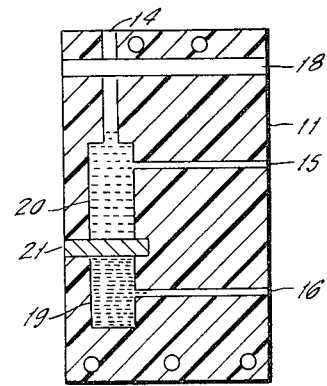

For blood typing, a predetermined quantity of whole blood and anticoagulant 17 is inserted by means of a syringe through inlet tube 14. This inlet tube is permanently sealed by heat-sealing along the zone 18; the container is placed in an upright position and left until the whole blood separates by sedimentation into two fractions, of red cells 19 and of serum 20, as shown in FIGURE 2. At this stage it is advisable to apply some pressure at the zone between these fractions so as to separate these from each other, and to permanently separate these by heat-sealing along the zone 21, as shown in FIGURE 3. The anticoagulant may of course be introduced beforehand into the container.

For blood typing single drops of blood cells and of serum can be delivered through the respective capillaries by applying pressure on the reservoirs. When the sedimentation is to be speeded up, the container with the blood may be centrifuged.

Figure 4:
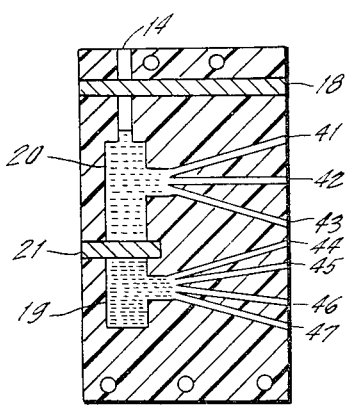

The container shown in FIGURE 4 is similar to that shown in FIGURE 3, but instead of the single delivery capillaries 15 and 16 there are provided a plurality of such capillaries; three capillary outlets 41, 42 and 43 being provided from the part 20 of the container which contains the serum and four capillaries, 44, 45, 46 and 47 being provided from the part of the container which contains the red cells 19. Through these capillaries there may be dispensed simultaneously 3 drops of serum and 4 drops of red cells, respectively, onto a suitable carrier, such as slide, tile or the like, for carrying out a determination of blood groups.

Figure 5:
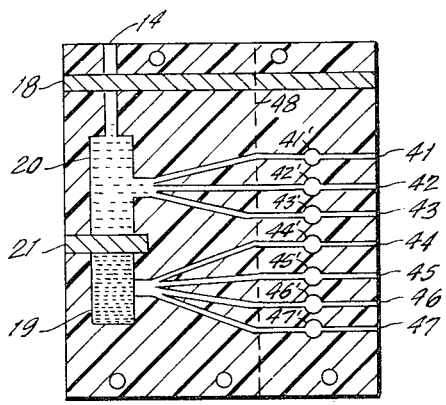
FIGURE 5 is a schematical front view of a container according to the present invention for dispensing drops of equal size.

The container-dispenser shown in FIGURE 5 is similar to that shown in FIGURE 4, the difference being the provision of the small reservoirs 41', 42', 43', 44', 45', 46' and 47' along the respective capillaries. These small reservoirs are of value when it is desired to dispense drops, the size of which is defined by the volume of these reservoirs. When the drops are to be dispensed, pressure is applied first on the main container 13 and the small reservoirs are filled, afterwards pressure is applied along a line 48 so as to interrupt the connection between the small containers and the main one, and when afterwards pressure is applied on the small containers, the contents of these is dispensed through the capillary outlets.

Figure 6:
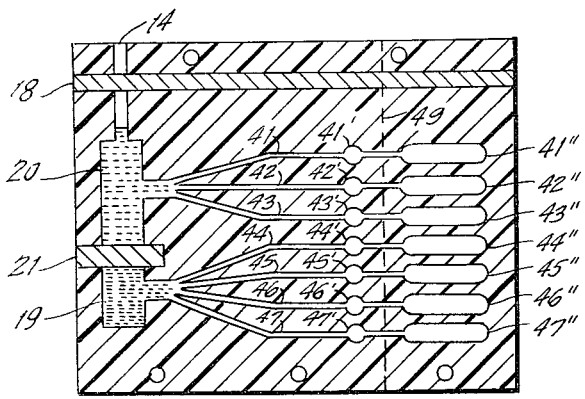
FIGURE 6 is a schematical front view of a container according to the present invention wherein means are provided for carrying out agglutination reactions or spot tests.

A further modification of the dispenser-container is shown in FIGURE 6. This is identical with the one shown in FIGURE 5, except for the provision of indentations 41" to 47", respectively. In this embodiment there is advantageously used a thicker lower plastic sheet and a thin upper one. The upper sheet extends only from the left hand edge up to the line 49. The indentations 41" to 47" are made by the application of heat and pressure and serve for carrying out in same the desired tests.

Figure 7:
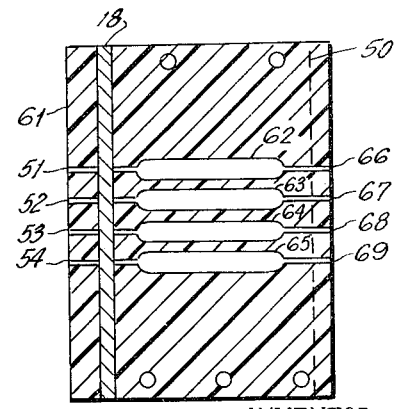
FIGURE 7 is a schematical front view of a dispenser-container for dispensing drop-size quantities of four discrete liquids.

In FIGURE 7 a dispenser-container is illustrated which is suited for dispensing drop-size quantities of four different reagents, sera or blood cells. It comprises two sheets 61, of equal size, which are superpositioned so as to coincide. Advantageously thin thermoplastic sheeting is used, which is heta-sealed over the entire area of the sheets except for the part of the area which subsequently defines the reservoirs 62, 63, 64 and 65, the filling tubes 51, 52, 53 and 54, and the capillaries extending therefrom, 66, 67, 68 and 69. The latter are advantageously formed by inserting suitable metal or glass rods between the sheets during the heat-sealing and withdrawing these afterwards. The four individual containers 62, 63, 64 and 65 are filled through the filling tubes 51, 52, 53 and 54 which may be sealed after filling. The contents of the four containers may be sealed by providing a zone of heat-sealing along line 50. Depending on the nature of the content, this may be stored for prolonged periods with or without sterilization or cooling. Before use, the right-hand side edge of the container is cut off so as to open the exits through the capillaries, and drop-size quantities may be obtained by squeezing.

For use in blood-typing containers of the type described with reference to FIGURE 7 were prepared, comprising seven reservoirs for the various sera and red cells required. These can be stored over prolonged periods and are very convenient for use in tests to be performed under adverse conditions, as well as in routine laboratory tests and procedures. A complete kit for carrying out blood-typing and cross-matching tests comprises a supply of containers as described with reference to FIGURES 1, 4, 5 and 6 a supply of containers containing the required sera (which may be contained in one multi-compartment container with 7 individual compartments), mixing sticks or glass rods and slides or the like for carrying out the agglutination reactions.

It is quite obvious that similar containers may be provided for different types of analysis, and especially for spot tests and for other serological tests.

I claim:
1. A dispenser-container for dispensing drop-size quantities of liquids, which comprises thermoplastic sheeting bonded together to define:
 (a) at least one discrete reservoir of relatively large size for storing a liquid therein, said reservoir having an upper part and a lower part,
 (b) at least one capillary tube extending from said upper part of said reservoir to an edge of said thermoplastic sheeting, said capillary tube being adapted for inserting liquid into said reservoir of relatively large size,
 (c) a relatively small reservoir of predetermined size,
 (d) at least one capillary tube extending from said lower part of said large reservoir to said small reservoir, and
 (e) a capillary tube extending to an edge of said sheeting from said small reservoir for removal of liquid therefrom.

2. The dispenser-container of claim 1 wherein said thermoplastic sheeting is polyethylene sheeting.

3. The dispenser-container of claim 1 wherein said dispenser-container is prepared from a relatively thick lower plastic sheet and a relatively thin upper plastic sheet.

4. The dispenser-container of claim 3 wherein said relatively thicker lower plastic sheet extends beyond an edge of said relatively thin upper plastic sheet, said lower sheet having an indentation in said extended part, and wherein said capillary tube (e) communicates with said indentation.

References Cited

UNITED STATES PATENTS 3,036,894   5/1962   Forestiere.
3,189,227   6/1965   Hobbs et al. _____ 222—94

MORRIS O. WOLK, Primary Examiner

R. M. REESE, Assistant Examiner

U.S. Cl. X.R.
222—94, 107